United States Patent
Vinnakota

(10) Patent No.: US 10,078,817 B2
(45) Date of Patent: Sep. 18, 2018

(54) CROSS-REPORT COLLABORATION

(71) Applicant: SAP SE, Walldorf (DE)

(72) Inventor: Devicharan Vinnakota, Walldorf (DE)

(73) Assignee: SAP SE, Walldorf (DE)

( * ) Notice: Subject to any disclaimer, the term of this patent is extended or adjusted under 35 U.S.C. 154(b) by 1125 days.

(21) Appl. No.: 13/772,225

(22) Filed: Feb. 20, 2013

(65) Prior Publication Data

US 2014/0236984 A1    Aug. 21, 2014

(51) Int. Cl.
*G06Q 10/10* (2012.01)

(52) U.S. Cl.
CPC .................. *G06Q 10/101* (2013.01)

(58) Field of Classification Search
CPC combination set(s) only.
See application file for complete search history.

(56) References Cited

U.S. PATENT DOCUMENTS

| | | | |
|---|---|---|---|
| 5,388,196 A * | 2/1995 | Pajak et al. | 715/751 |
| 6,397,191 B1 * | 5/2002 | Notani | G06F 9/46 705/7.26 |
| 6,675,197 B1 | 1/2004 | Satoh et al. | |
| 6,917,938 B2 | 7/2005 | Shea et al. | |
| 7,103,846 B1 | 9/2006 | Shafrir et al. | |
| 7,236,973 B2 | 6/2007 | Kalthoff et al. | |
| 7,543,237 B2 | 6/2009 | Kontny et al. | |
| 8,103,608 B2 | 1/2012 | Green et al. | |
| 8,250,169 B2 | 8/2012 | Beringer et al. | |
| 8,280,755 B2 | 10/2012 | Stuhec et al. | |
| 2003/0018719 A1 * | 1/2003 | Ruths et al. | 709/205 |
| 2003/0175676 A1 * | 9/2003 | Theilmann | G09B 7/00 434/350 |
| 2003/0208459 A1 | 11/2003 | Shea et al. | |
| 2006/0026235 A1 * | 2/2006 | Schwarz | G06Q 10/10 709/205 |
| 2006/0117042 A1 * | 6/2006 | Hu | G06Q 10/10 |
| 2006/0136432 A1 * | 6/2006 | Villaron | G06F 9/44505 |
| 2008/0059500 A1 * | 3/2008 | Symens | G06F 17/30592 |
| 2008/0229214 A1 * | 9/2008 | Hamilton | G06Q 10/06 715/751 |
| 2009/0055796 A1 | 2/2009 | Springborn et al. | |
| 2009/0265634 A1 | 10/2009 | Beringer et al. | |
| 2010/0077317 A1 * | 3/2010 | Kritt | G06Q 10/107 715/752 |
| 2010/0174662 A1 | 7/2010 | Fabella, Jr. et al. | |

(Continued)

OTHER PUBLICATIONS

Business Intelligence—Wikipedia, the free encyclopedia (en.wikipedia.org/wiki/business_intelligence), retrieved on Nov. 29, 2012, 11 pages.

(Continued)

*Primary Examiner* — Augustine K. Obisesan
(74) *Attorney, Agent, or Firm* — Brake Hughes Bellermann LLP

(57) ABSTRACT

Systems and methods for cross-report collaboration include receiving an identifier for a class of data underlying a first report. A collaboration associated with at least a portion of a second report is identified based on the class of data underlying the first report. Data regarding the identified collaboration is provided in conjunction with the first report to signify that at least a portion of the data underlying it is subject to the collaboration.

20 Claims, 9 Drawing Sheets

(56) References Cited

U.S. PATENT DOCUMENTS

| | | | |
|---|---|---|---|
| 2011/0010332 A1* | 1/2011 | Vasudevan | G06Q 10/10 707/608 |
| 2011/0040802 A1* | 2/2011 | Bonatti | G06F 17/30569 707/803 |
| 2011/0107231 A1 | 5/2011 | Gueldemeister | |
| 2012/0078802 A1 | 3/2012 | Kieselbach | |
| 2012/0259894 A1* | 10/2012 | Varley et al. | 707/795 |
| 2014/0122591 A1* | 5/2014 | Roche et al. | 709/204 |
| 2014/0130135 A1 | 5/2014 | Mao et al. | |

OTHER PUBLICATIONS

Business Objects Universe Builder Guide, Mar. 5, 2008, 58 pages.
Components of a Business Objects Universe, Business Intelligence, Vendors and Products Nov. 29, 2011 (bi-insider.com/portfolio/components-of-a-business-objects-universe/), retrieved on Dec. 3, 2012, 7 pages.
Dimensional Model Components Concept (www.executionmih.com/data-warehouse/dimensional-model-components.php), retrieved on Nov. 28, 2012, 2 pages.
Langer, Stephane-Robert, Cubes and Universes (srlanger.com/2006/05/24/cubes-and-unviverses/), retrieved on Nov. 28, 2012, 7 pages.
Manocha et al., SAP Hierarchy in Business Objects with Expanded Hierarchy Logic, Aug. 4, 2010, 14 pages.
Smith, Nic, Analytics from SAP, Taking Advantage of the Cloud with Analytics, Jun. 6, 2012, 3 pages.

* cited by examiner

CROSS-REPORT COLLABORATION

BACKGROUND

Many companies today rely on business intelligence systems to store and analyze data regarding their business processes. Such a business intelligence system may receive data regarding the business from any number of sources. For example, a business intelligence system may receive data regarding the company's employees from a payroll or human resources (HR) system. In another example, a business intelligence system may receive data regarding products manufactured and sold by the company from an enterprise resource planning (ERP) system. In a further example, a business intelligence system may receive data regarding a competitor's products, such as pricing information.

In addition to receiving and storing data regarding a company's operations, a business intelligence system may also include various utilities that use the data for purposes of driving business decisions, benchmarking, planning, and other functions. To this end, report generation plays an important role in allowing decision makers to quickly review and assess the various aspects of the business. For example, a sales report may allow a sales manager to determine which products are selling well, which members of the sales team are performing poorly, or how sales revenues compare to other time periods.

As a company expands geographically, collaboration between employees becomes increasingly important for the wellbeing of the company. Larger companies may have hundreds of offices scattered throughout the world with tens of thousands of employees. However, a company's reporting structure may not be strictly tied to its office locations. For example, a sales manager in Boston may oversee a sales team located throughout the company's New England offices. In such a case, team members located in Hartford, Conn. and New Haven, Conn. may work together to create a sales report for the entire state of Connecticut. However, it remains challenging and difficult to develop systems that allow users to collaborate on reports.

SUMMARY

Implementations of the systems and methods for cross-report collaboration are disclosed herein. One implementation is a computerized method for managing collaborations spanning multiple reports and reporting platforms. The method includes generating a collaboration instance in response to receiving an indication that a first data object of a first report of a first reporting platform has been modified. The collaboration instance includes a data structure which associates the first data object with collaboration metadata. The method also includes receiving a notification that a second data object of a second report of a second reporting platform has been selected for use. The method further includes searching, in response to the received notification, for collaboration instances related to the second data object. The method additionally includes identifying the generated collaboration instance as related to the second data object using at least the data structure associating the first data object with the collaboration metadata. The method also includes providing the collaboration metadata to the second reporting platform in response to the received notification.

Another implementation is a system for managing collaborations spanning multiple reports and reporting platforms. The system includes a processing circuit configured to generate a collaboration instance in response to receiving an indication that a first data object of a first report of a first reporting platform has been modified. The collaboration instance includes a data structure which associates the first data object with collaboration metadata. The processing circuit is also configured to receive a notification that a second data object of a second report of a second reporting platform has been selected for use. The processing circuit is further configured to search, in response to the received notification, for collaboration instances related to the second data object. The processing circuit is also configured to identify the generated collaboration instance as related to the second data object using at least the data structure associating the first data object with the collaboration metadata. The processing circuit is further configured to provide the collaboration metadata to the second reporting platform in response to the received notification.

Another implementation is a computerized method for identifying a collaboration as being associated with a report, the collaboration having been created via a collaboration service and associated with a second report to allow users to collaborate on at least a portion of the second report. Both reports are also based in part on overlapping data. The method includes receiving, at a processing circuit, an identifier for a class of data underlying the report. The method also includes identifying, by the processing circuit, the collaboration associated with the second report based on the class of data. The method further includes providing, by the processing circuit, data regarding the identified collaboration in conjunction with the report to signify that at least a portion of the data underlying the report is subject to the collaboration.

These implementations are mentioned not to limit or define the scope of the disclosure, but to provide an example of an implementation of the disclosure to aid in understanding thereof. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

According to some aspects of the present disclosure, systems and methods are disclosed that allow users to collaborate on reports at the sub-report level and across different reports. For example, members of a sales team in Connecticut may collaborate on a first sales report pertaining to statewide Q1 sales. Members located in Hartford may collaborate on the Hartford office's contribution to the statewide sales report, while members located in New Haven may collaborate on the New Haven office's contribution to the sales report. In another example, the sales team members in Connecticut may collaborate with members in other New England offices to create a yearly sales report for all of New England.

In various embodiments, data indicative of a collaboration effort may be associated with the underlying data of a report. For example, a sales team member in a company's Hartford office may collaborate with others to reflect that office's contribution to a statewide sales report (e.g., John and Jane are responsible for the Hartford office's sales numbers). Collaboration data indicating which users are responsible for which portion of the statewide report may be stored and associated with the underlying data of the statewide report. For example, data indicating that John and Jane are responsible for the Hartford office's sales numbers may be associated with the data and metadata regarding the Hartford office's sales numbers. In some embodiments, collaboration data may also be retrieved and provided based on the underlying data or metadata of a report. For example, a yearly report for sales in New England that is also based on sales information regarding the Hartford office may utilize the stored collaboration data such that John and Jane are responsible for the Hartford office's sales numbers in that report as well.

Since a collaboration is associated with the underlying data of a report and not just the report itself, the collaboration may be carried over from one report to another regardless of the reporting utility used. For example, a statewide sales report may be created using a first reporting application and a regional sales report may be created using a second reporting application. A collaboration on a portion of the first report may be reflected in the corresponding part of the second report, since their underlying data is the same or is related. Therefore, a collaboration between users in the first report may be retrieved and used in the second report, even though the reports are created and edited using different applications. In further embodiments, the collaboration techniques described herein may be adapted to allow collaboration across any number of different forms of electronic documents.

Figure 1:
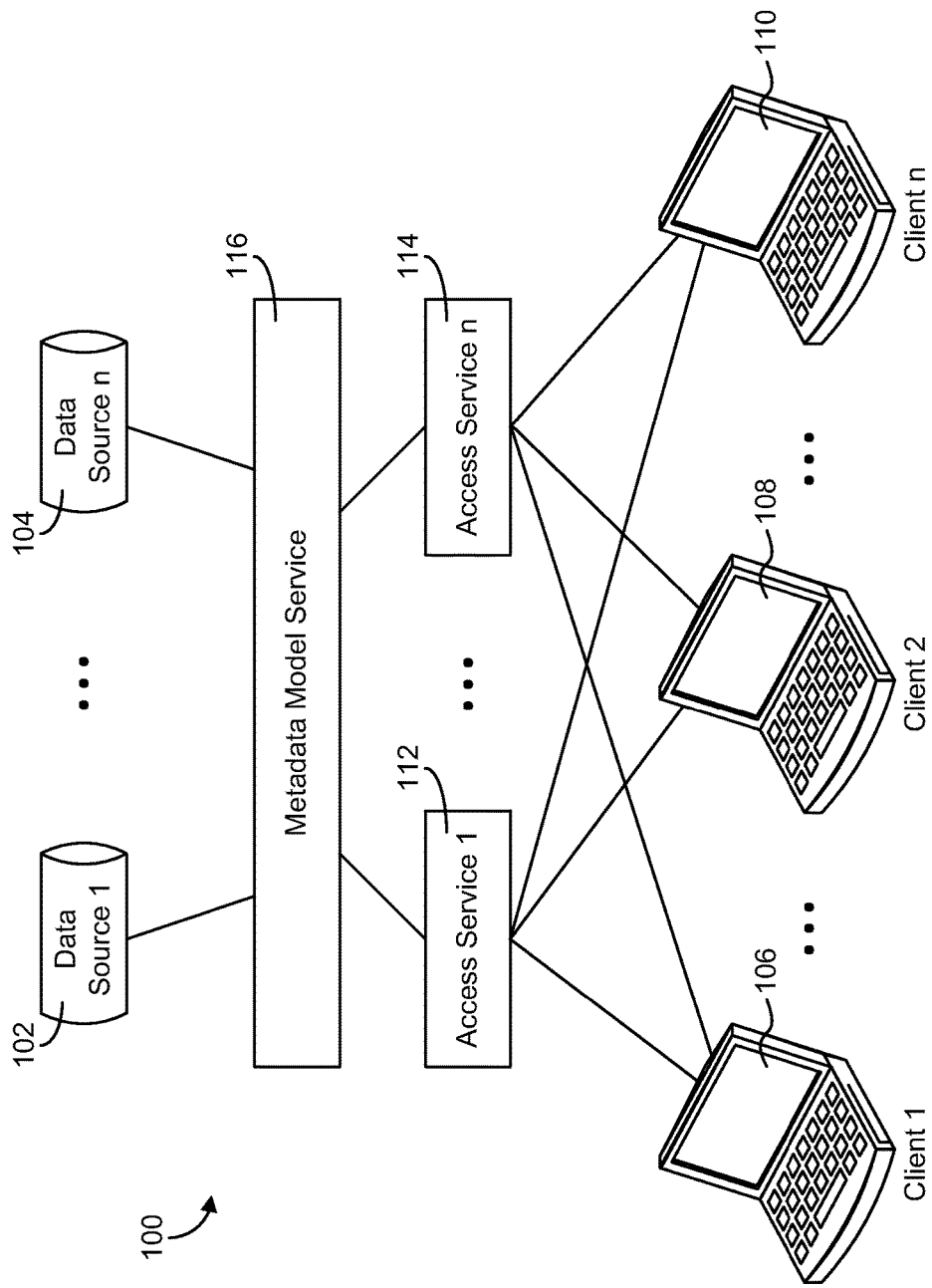
FIG. 1 is a block diagram of a computer system in accordance with an exemplary embodiment.

Referring to FIG. 1, a block diagram of a computer system 100 in accordance with an exemplary embodiment is shown. System 100 includes one or more client devices 106-110 (e.g., a first device, a second device, etc., through an nth device) configured to access business data available from one or more data sources 102-104 (e.g., a first through nth data source). As shown, system 100 may also include one or more access services 112-114 (e.g., a first through nth service) configured to allow client devices 106-110 to access data sources 102-104 or perform other functions, such as analyzing data from data sources 102-104, providing reporting utilities, providing collaboration utilities, and other business intelligence-related functions. Computer system 100 may also include a metadata model service 116 that provides a layer of abstraction between data sources 102-104 and access services 112-114.

Client devices 106-110 are computing devices that may allow users to add, modify, analyze, and delete data stored in data sources 102-104. Exemplary computing devices include, but are not limited, desktop computers, laptop computers, tablet computers, mobile devices, and smart televisions. Client devices 106-110 may each include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housings of client devices 106-110 (e.g., a built-in display, microphone, etc.) or external to the housing of client devices 106-110 (e.g., a monitor connected to client device 106, a speaker connected to client device 108, etc.), according to various implementations. For example, client device 106 may include an electronic display, which displays webpages and other data received from access services 112-114.

Access services 112-114 may be software applications stored and executed by one or more servers in communication with client devices 106-110. For example, access service 112 may be executed by a first server and access service 114 may be executed by a second server. In another example, access services 112-114 may be executed by the same server. According to various embodiments, client devices 106-110 may execute local applications to make use of access services 112-114. For example, access service 112 may provide a webpage-based interface to a web browser on client device 108, to allow the user of client 108 to interact with access service 112. In another example, client device 106 may execute a stand-alone application to interact with access service 114 (e.g., an application specifically configured to utilize access service 114). For example, the stand-alone application may include the logic for the visual layout of interface screens displayed by client device 106 and access service 114 may provide data values to the stand-alone application for presentation on the screens. In a further example, client 110 may execute a thin client application that receives data from access service 112.

Access services 112-114 may communicate with client devices 106-110 via a data communications network. The network may include the Internet and/or other types of data networks, such as a local area network (LAN), a wide area network (WAN), a cellular network, satellite network, or other types of data communications networks. The network may also include any number of intermediary computing devices (e.g., computers, servers, routers, network switches, etc.) that are configured to receive and/or transmit data. The network may further include any number of hardwired and/or wireless connections. For example, client device 106 may interface with the network via a wireless connection (e.g., via WiFi, cellular, radio, etc.) or via a hardwired connection (e.g., via a fiber optic cable, a CAT5 cable, etc.). In various embodiments, client devices 106-110 and access services 112-114 may be located within the same area (e.g., the same building or campus) or may be separated geographically (e.g., access services 112-114 and client devices 106-110 may be located in different locations throughout the world).

Client devices 106-110 may each include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housings of client devices 106-110 (e.g., a built-in display, microphone, etc.) or external to the housing of client devices 106-110 (e.g., a monitor connected to client device 106, a speaker connected to client device 108, etc.), according to various implementations. For example, client device 106 may include an electronic display, which displays webpages and other data received from access services 112-114.

Data sources 102-104 may include any number of files, applications, or databases in which business data may be stored. Exemplary data sources include, but are not limited to, spreadsheets, XML files, databases, database cubes, and business applications (e.g., an ERP system, a customer relationship management system, etc.). Data sources 102-104 may be stored on the same computing devices that execute access services 112-114 or on other networked devices, in various embodiments. For example, servers in a data center may store data sources 102-104 and execute access services 112-114. In another example, access service 114 may provide a search query to a remote data source 102 via the Internet.

According to various embodiments, computer system 100 includes a metadata model service 116 that provides a layer of abstraction between the underlying data storage mechanisms of data sources 102-104. In general, metadata model service 116 is configured to allow a user to define relationships among the data stored in data sources 102-104 without requiring the user to have knowledge of the underlying access mechanisms of data sources 102-104. For example, data source 102 may be a database in which data is accessed using the Structured Query Language (SQL). Metadata model service 116 may generate the corresponding SQL statements based on metadata relationships specified via metadata model service 116. In other words, a user may use metadata model service 116 to define related groups of data stored in data sources 102-104 for purposes of searching and modifying the stored data, without the user needing specific knowledge of the underlying tables, views, and languages used by data sources 102-104.

Access services 112-114 accesses the data stored in data sources 102-104 using the defined relationships in metadata model service 116, in one embodiment. For example, assume that data source 102 is a database that includes a table relating sales revenues to dates. Metadata model service 116 may include an object corresponding to the time period of Jan. 1, 2016 to Mar. 31, 2016 (e.g., Q1 of 2016). The Q1 2016 object may include all of the necessary information to query the table in data source 102. Thus, access services 112-114 can interact with the Q1 2016 object to access the underlying data stored in data source 102 in lieu of issuing the SQL statements directly.

Figure 2:
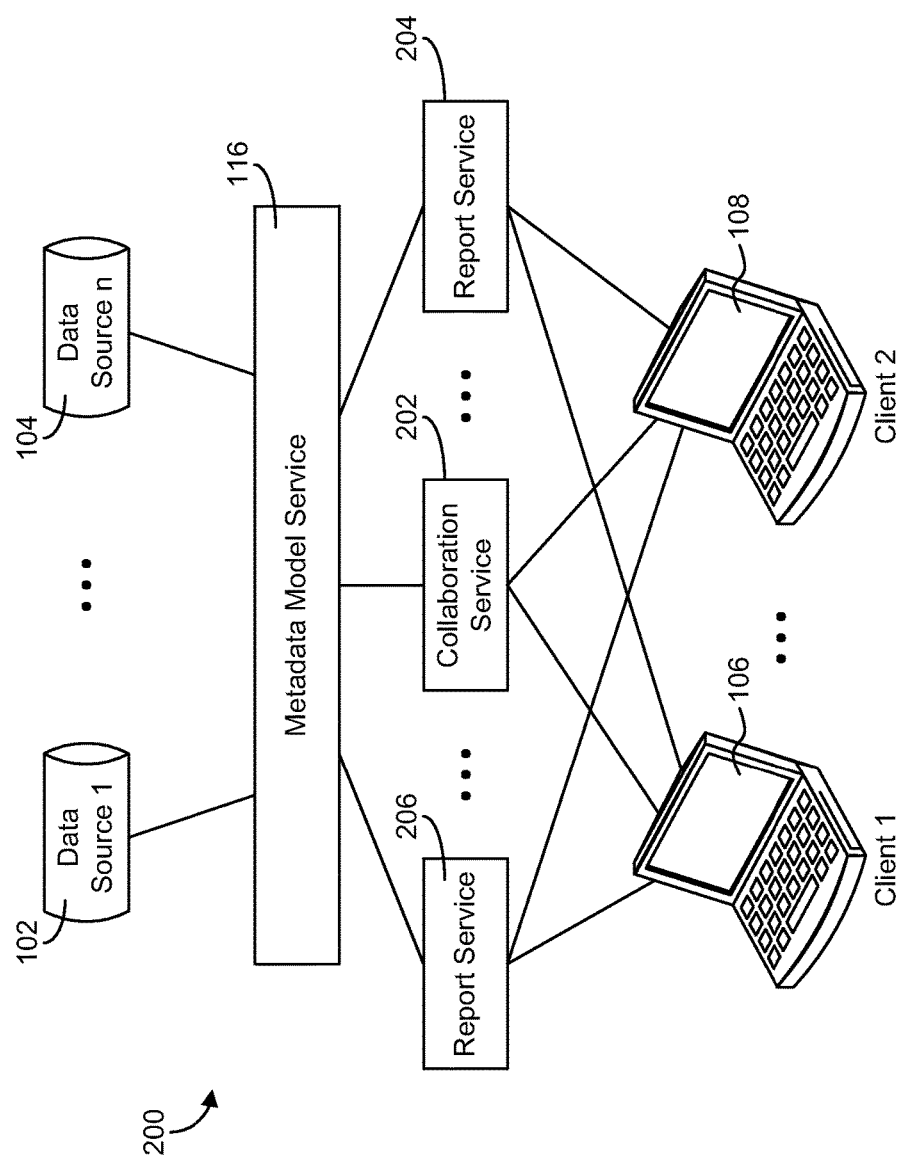
FIG. 2 is an illustration of a computer system configured to allow users to collaborate on reports, according to an exemplary embodiment.

Referring now to FIG. 2, an illustration 200 is shown of a computer system configured to allow users to collaborate on reports, according to an exemplary embodiment. In the example shown, computing service 100 of FIG. 1 includes one or more report services 204-206 (e.g., a first through nth report service) as part of access services 112-114 and configured to allow users of client devices 106-108 to create reports using the data stored in data sources 102-104. Computing system 100 also includes a collaboration service 202 as part of access services 112-114 configured to allow users of client devices 106-108 to collaborate on projects, documents, and/or reports created via report services 204, 206.

In various embodiments, users of client devices 106, 108 may specify data stored in data sources 102-104. For example, a sales team member using client device 106 may upload a spreadsheet of sales figures for a particular retail location over a specific time period. The stored sales figures may then be usable within report services 204, 206 to create sales reports.

Report services 204-206 may be configured to generate any number of different types of reports. Exemplary reports may include, but are not limited to, lists, tables, charts (e.g., pie charts, histograms, etc.), and graphs (e.g., bar graphs, line graphs, etc.). For example, a sales report for the New England region may include a pie chart that breaks down sales by state. Report services 204-206 may be provided by the same vendor or different vendors, in various embodiments. For example, report services 204-206 may be Crystal Reports, Web Intelligence, or Xcelsius services available from SAP AG and/or report services available from another vendor. In other embodiments, other services configured to allow a user to create or modify remotely stored documents may be used in addition to, or in lieu of, report services 204-206.

According to various embodiments, the computer system shown in illustration 200 may also include a collaboration service 202. In general, collaboration service 202 is configured to allow client devices 106, 108 to create, access, and modify the same data stored in data sources 102-104. Collaboration service 202 may also provide additional services to client devices 106, 108, such as messaging services, conferencing services, calendar services, etc. For example, a project may be created via collaboration service 202 in which the users of client devices 106, 108 may collaborate on a particular project. In some embodiments, collaboration service 202 may control access to certain functions and data using security settings. For example, a project manager may have administrative control over which employees may access or modify a given document. In one embodiment, collaboration service 202 provides a web portal that may be accessed by client devices 106, 108.

Collaboration service 202 may be configured to allow users of report services 204-206 to collaborate on reports, in some embodiments. For example, assume that client device 106 is operated by a sales team member located in Hartford and that client device 108 is operated by a sales team member located in New Haven. In such a case, collaboration service 202 may authorize the respective users of client devices 106, 108 to work on the same sales report for Connecticut. In one embodiment, collaboration service 202 may store collaboration data in data sources 102-104 indicative of a defined collaboration. Collaboration data may include, for example, an identifier for a collaboration effort, documents associated with the collaboration effort, or security data that controls which user accounts are able access or modify the documents associated with the collaboration effort. For example, collaboration service 202 may store collaboration data in data sources 102-104 indicative of the New England sales team collaborating on various sales reports for that region.

According to various embodiments, collaboration service 202 may use metadata model service 116 to associate collaboration data with the metadata objects underlying a report or document editable via one of report services 204-206. A particular collaboration may be associated with all metadata objects of a report or only a portion of the objects. For example, a sales report for the New England region may be based on metadata objects associated with the different offices or states located in New England (e.g., metadata objects indicative of locations). A collaboration instance may be created via collaboration service 202 that is associated with all of the location metadata objects of the New England sales report (e.g., across all locations) or may be associated with only a subset of the locations (e.g., a particular collaboration instance may be tied only to the New Haven-related sales figures). In other words, the users of client devices 106, 108 may collaborate at the report level or only on a portion of a report (e.g., one or more cells of data used in the report) created via one of report services 202-204. For example, one collaboration instance may be associated with only the Q3 sales figures from the New Haven office and a second collaboration instance may be associated with the Q3 sales figures from the Boston office.

Once collaboration data has been associated with a particular set of metadata objects by collaboration service 202, the collaboration data may be retrieved and used when a particular report uses the associated metadata objects. For example, assume that a first report created via report service 204 is a Q3 sales report for the New England region and a second report created via report service 204 is a Q3 sales report for Connecticut. Also, assume that a collaboration has been created via collaboration service 202 to allow sales team members in Hartford to contribute to the Hartford-related portion of the Connecticut report. In such a case, collaboration service 202 may associate the collaboration data surrounding the collaboration with the metadata objects corresponding to the Hartford-related portion of the Q3 sales report for Connecticut. Since the New England sales report also uses the metadata objects corresponding to the Hartford-related report information, the associated collaboration data may be retrieved by collaboration service 202 and used with the New England sales report. In other words, using collaboration service 202 to create a collaboration on one portion of a report may cause the collaboration to be reflected in other reports that also use this data. In some embodiments, the reports may even be edited using different report services. For example, a collaboration on a data set for a report accessible via report service 206 may be reflected in another report accessible via report service 204 that uses the same or similar data.

In one embodiment, data that uniquely identifies the metadata objects of a report may be provided to client devices 106, 108 when the report is accessed. For example, report service 204, report service 206, or collaboration service 202 may send one or more files to client device 106 when it accesses a given report. The one or more files may include unique identifiers for the metadata objects associated with the report. For example, report service 204 may provide an XML file to client device 106 that includes unique identifiers for the metadata objects corresponding to the "sales revenues," "location," and "year" metadata objects managed by metadata model service 116. The one or more files may also include unique identifiers for each visual element used as part of a report (e.g., a cell of a table, a "slice" of a pie chart, etc.) that are tied to the metadata objects. For example, one identifier for a visual element may correspond to a table entry for the office location associated with a particular sales figure.

In some embodiments, collaboration service 202 may be configured to allow a user to create a new collaboration for any visual elements that is part of a report accessed via one of report services 204-206. For example, a user of client device 106 may create a new collaboration by operating an interface device to indicate that a particular visual element of a report is to be collaborative (e.g., by right clicking a mouse on the visual element, by double clicking the visual element, by selecting the visual element using a touch screen display, etc.). In response, client device 106 may provide the corresponding unique identifiers for the visual element and any associated metadata objects to collaboration service 202. Collaboration service 202 may then generate new collaboration data for the collaboration and associate the collaboration data with the metadata objects from metadata model service 116 associated with the visual element. In one embodiment, collaboration service 202 may generate a graph, map, or other data structure to relate the metadata objects to the collaboration data and store the generated graph or map in data sources 102-104.

An existing collaboration may also be retrieved from data sources 102-104 by collaboration service 202 when a report is accessed or created via report services 204-206. For example, assume that a collaboration is associated with the metadata objects for the Hartford-related sales figures. If another report that uses the Hartford-related sales figures is opened using the same report service or a different report service, collaboration service 202 may associate the collaboration with the corresponding portions of that report as well. In one embodiment, client devices 106, 108 may utilize an application programming interface (API) of collaboration service 202 to send identifiers for the metadata objects underlying a report, when the report is accessed via one of report services 204-206. In response, collaboration service 202 may determine whether the metadata objects are associated with an existing collaboration. If so, collaboration service 202 may send the appropriate settings for the collaboration to the client device (e.g., by causing client devices 106 to display indicia of the collaboration, by enforcing a security policy surrounding the collaboration, etc.). For example, the portion of a New England sales report relating to the Hartford office may reflect a collaboration, if the collaboration is first set for the corresponding data in a sales report for Connecticut.

Figure 3:
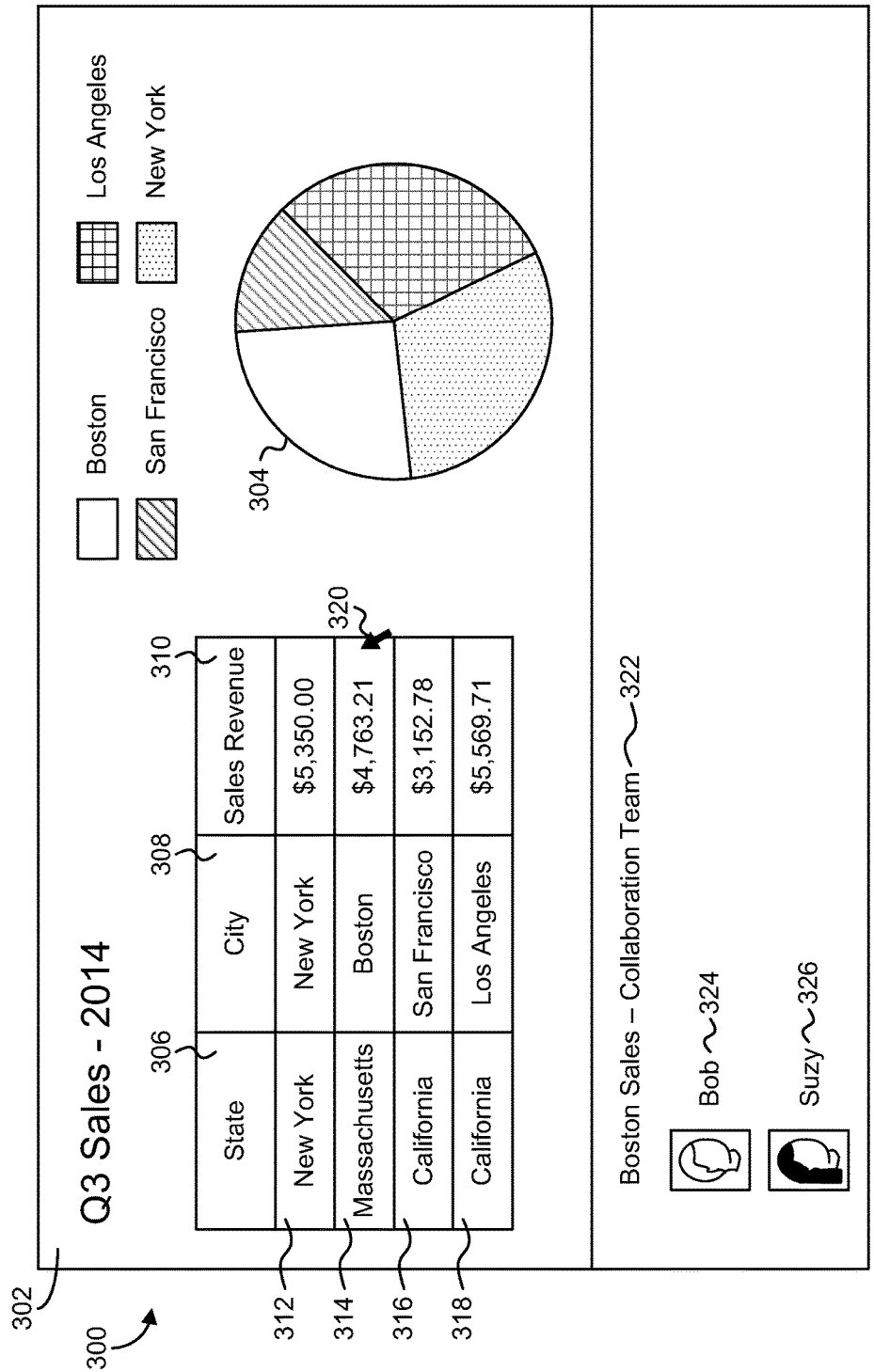
FIG. 3 is an illustration of a collaborative report, according to an exemplary embodiment.

Referring now to FIG. 3, an illustration of a collaborative report is shown, according to an exemplary embodiment. Collaborative report 300 may be displayed on a display 302 of a client device in response to the client device accessing report and collaboration services. For example, client device 106 may include display 302, access collaboration service 202 and report service 204, to retrieve collaborative report 300. In some embodiments, the collaboration and report services may be accessed by the client device via a stand-alone application. For example, the client device may execute an application specifically configured to access the collaboration and report services. In other embodiments, the client device may execute a web browser application to access report 300 (e.g., report 300 is provided to the client device via a web page). A webpage or application screen displayed by display 302 may include data or functions associated with either or both of the collaboration and report services. In one example, collaboration report 300 may be a single webpage generated by the report service. In some embodiments, the collaboration service may generate a web portal that causes a frame-like structure to be displayed by display 302. For example, the collaboration service may utilize iframes or a similar mechanism to display a first webpage that includes report 300 with a second webpage that includes a collaboration window 322.

In the example shown, report 300 is a U.S. sales report for Q3 2014 (e.g., a three month long financial period in 2014). Report 300 may include various charts, tables, or similar indicia to convey information regarding the sales figures. For example, report 300 is shown to include a pie chart 304 representing the total percentage of sales across sales offices located in Boston, San Francisco, Los Angeles, and New York. Similarly, report 300 is also shown to include a table that relates state column 306, city column 308, and sales revenue column 310. Rows 312-318 may each represent the sales figures from the New York, Boston, San Francisco, and Los Angeles offices, respectively.

In one embodiment, a user interface device may be used to select a visual element displayed as part of report 300. For example, a pointing device may be used to position a cursor 320 on row 314 or on a cell of row 314. Other exemplary visual elements that may be selectable include the pieces of pie chart 304, rows 312, 316-318, and the individual cells of rows 312, 316-318. In other embodiments, other forms of reports, documents, or graphical interfaces may be presented on display 302 in lieu of report 300. For example, a displayed text document may include visual elements that correspond to different paragraphs of the document. In another example, report 300 may be displayed with other windows configured to allow users to message one another, schedule meetings, create collaborations, or manage an existing collaboration (e.g., by assigning users, documents, etc., to the collaboration). For example, collaboration window 322 may indicate that a collaboration has been created for the Boston sales office's sales figures.

Any number of user accounts may be associated with a particular collaboration. As shown, user accounts 324, 326 have been assigned to the collaboration effort for the Boston office's sales numbers. In one embodiment, either or both of user accounts 324, 326 have total control over the data regarding the Boston office's sales figures in Q3, 2014. For example, the users "Bob" and "Suzy" may be authorized to upload or update any of the data underlying the Boston office's sales figures for Q3, 2014.

When the collaboration indicated by collaboration window 322 is created, the metadata objects associated with the corresponding visual element (e.g., row 314) may also be associated with the collaboration. For example, a particular set of metadata objects corresponding to the set {Year: 2014, State: Massachusetts, City: Boston, SalesRevenue} and associated with row 314 may be sent to the collaboration service, when the collaboration is created. In some embodiments, the ordering in which the set elements appear is unimportant (e.g., the set {Year: 2014, State: Massachusetts, City: Boston, SalesRevenue} is equivalent to the set {State: Massachusetts, City: Boston, SalesRevenue, Year: 2014}). This set of metadata objects may then be associated with the collaboration instance by the collaboration service. In other words, the collaboration instance between "Bob" and "Suzy" may be associated with the metadata objects underlying report 300 in addition to, or in lieu of, report 300 itself. Whenever a report that is based in part on this set of data is accessed later, the user may be notified regarding the collaboration between Bob and Suzy. For example, a report on the worldwide sales revenues in the year 2014 may be provided with a notification that "Bob" and "Suzy" are responsible for the Q3, 2014 sales figures for the Boston office.

Figure 4:
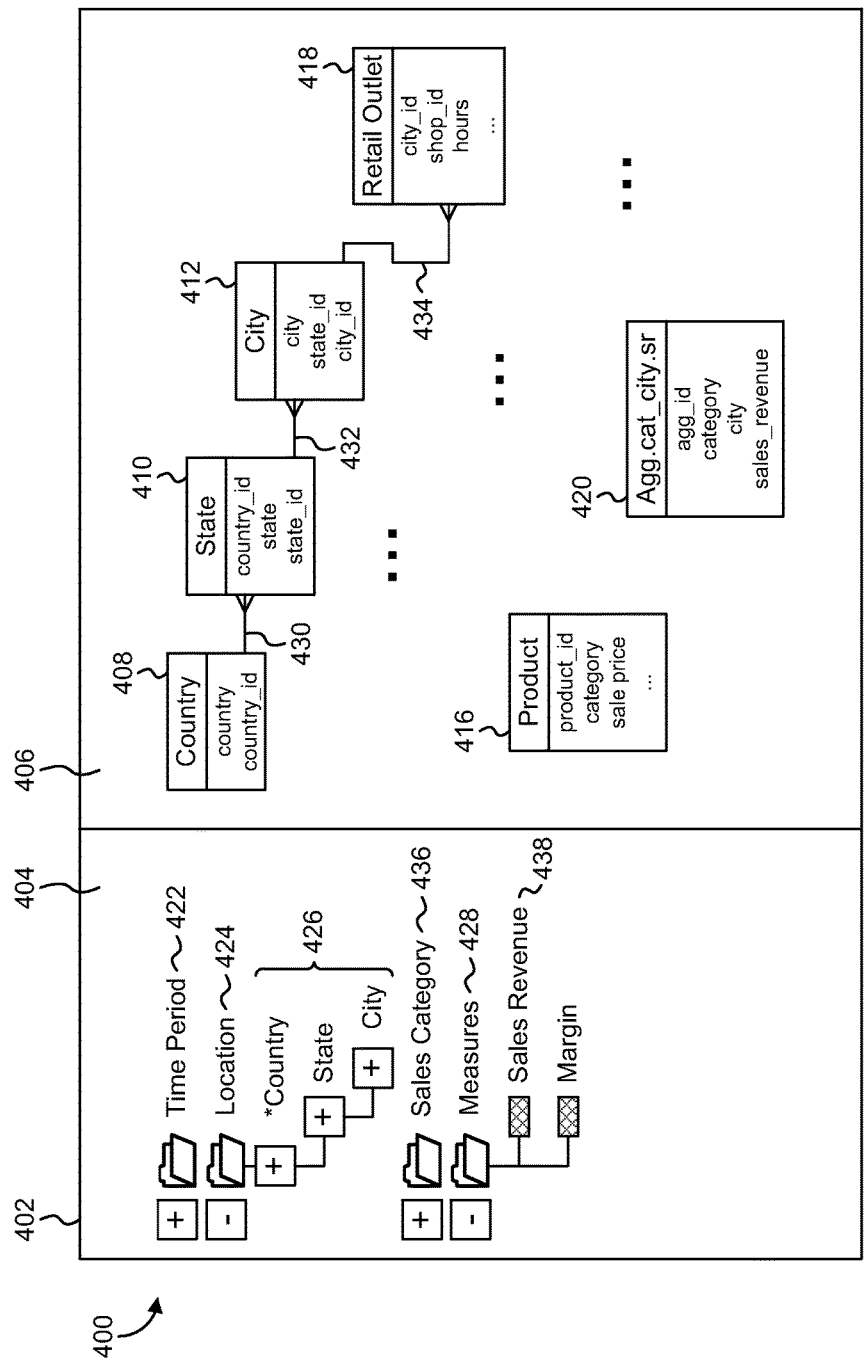
FIG. 4 is an illustration of a metadata model being constructed, according to an exemplary embodiment.

Referring now to FIG. 4, an illustration 400 of a metadata model being constructed is shown, according to an exemplary embodiment. In general, a metadata model is an abstraction layer that sits on top of the underlying database tables, views, etc. of a data source. Also known as a "universe," a metadata model uses metadata to describe certain types of data stored in one or more databases. A user may then interact with the metadata objects in the model, without requiring the user to have knowledge regarding where the underlying data is stored or how the underlying data is accessed (e.g., the SQL or other commands used to access the underlying data). In various embodiments, a metadata model may be built on top of one or more databases or on top of one or more "cubes" of data, such as an OLAP cube.

As shown, a metadata model may be constructed manually via a graphical user interface 402 to represent data stored in one or more databases. Interface 402 may include a first window 404 in which metadata objects may be organized and a second window 406 in which relationships between tables may be defined. Window 406 may display icons representing the various tables, views, etc., of the underlying databases. For example, window 406 may display table icons 408-420, which represent the actual tables of the one or more underlying databases (e.g., table icons 408-420 may represent points to the actual database tables). Table icons 408-420 may list the actual names of the underlying tables or may utilize alias names for the underlying tables, in various embodiments. Each of table icons 408-420 may also include identifiers for the contents of their underlying tables. For example, a country database table represented by table icon 408 may include columns for "country" and "country_id," a unique country code.

Data stored in different database locations may be joined to form a set of related data. For example, join icons 430-434 may represent the relationships between countries, states, cities, and retail outlet locations across the tables underlying table icons 408-418. In one embodiment, join icons 430-434 represents conditions used when performing a query across multiple tables of a database.

A metadata model may also include one or more metadata objects. In various embodiments, a metadata object may be a dimension, a detail, or a measure. A dimension object generally refers to a name or other identifier used to represent a set of values from a database query. For example, "year," "category," and "sales office" may be dimensions that may be used in condition statements to query data from the underlying data sources. A detail object refers to any metadata that may be attached to a detail object that provides additional information regarding the dimension object. A measure object generally refers to any numerical value that may be computed or compared across dimensions. For example, "sales revenue" may be a measure object that may be measured across the "year," "category," or "sales office" dimensions. In some embodiments, a measure object may correspond to a mathematical function that is applied to multiple stored values across the dimensions. For example, a "sales revenue" measure object may correspond to a summation of individual sales across the defined dimensions (e.g., the sales revenue object may correspond to the sum of individual sales for the Boston office across the Q3, 2014 time period).

In window 404, metadata objects may be organized using classes. In general, classes provide a mechanism whereby similar types of metadata objects (e.g., dimension objects, measure objects, etc.) may be grouped. For example, window 404 may include classes 422, 424, 428, 436 that represent a "Time Period" class, a "Location" class, a "Measures" class, and a "Sales Category" class, respectively. In one embodiment, the classes may be arranged in window 404 according to a folder structure. Under each class, the defined metadata objects may be grouped. For example, a "sales revenue" measure object 438 may be grouped under the measures class 428. In various embodiments, dimension objects in a class may be placed in one or more structured hierarchies. For example, hierarchy 426 represents the various levels of detail available from location-related dimension objects (e.g., country, state, city, etc.). In other words, a lower node in a hierarchy may have overlapping data with a higher node in the hierarchy (e.g., data associated with a particular city located in a state may overlap some of the data associated with the state).

The metadata objects shown in illustration 400 may be referenced by a report service, in lieu of referencing the actual tables, views, etc., of the underlying data sources. For example, a sales report may reference "sales revenue" measure object 438, a "year" dimension object, and a "category" dimension object to show sales revenues broken down by year and sales category. Thus, users working on the report are able to access data stored in the underlying data sources (e.g., database, OLAP cube, etc.), without requiring the knowledge to query the data in these sources.

In various embodiments, a collaboration may be associated with one or more of the metadata objects shown in FIG. 4. For example, assume that users are collaborating on sales figures for a sales office located in a particular city. In such a case, an identifier for the collaboration may be associated with the "city" metadata object 412. In some embodiments, any metadata objects associated with metadata object 412 may likewise be associated with the collaboration identifier. For example, the collaboration identifier may also be associated with the "state" metadata object 410 and the "country" metadata object 408, since metadata object 412 belongs to the same hierarchy as metadata objects 410, 412. Thus, the collaboration may be identified for any report that is based on the city metadata object. For example, a report on the national sales figures may include a notification that a particular collaboration exists for the sales figures from one of the cities included in the report.

Figure 5:
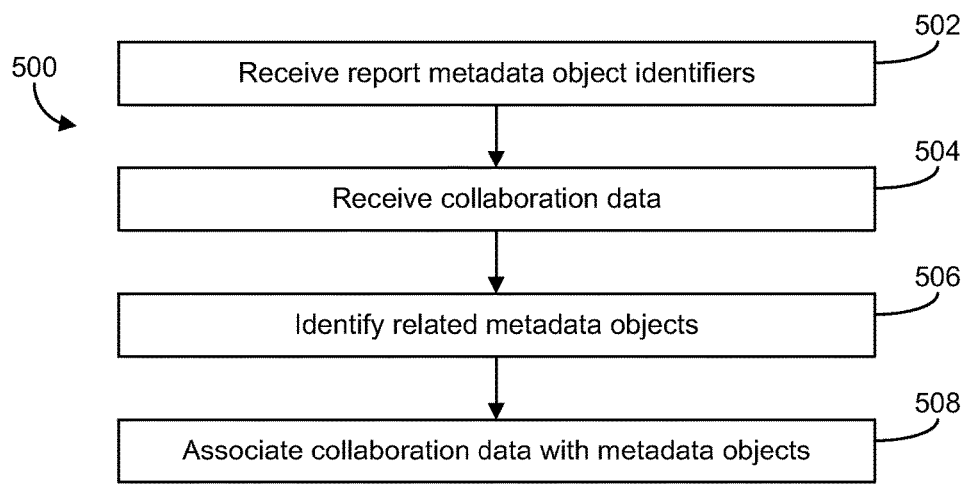
FIG. 5 is a flow diagram of a process for associating collaboration data with report data, according to an exemplary embodiment.

Referring now to FIG. 5, a flow diagram is shown of a process 500 for associating collaboration data with report data, according to an exemplary embodiment. Process 500 may be implemented by one or more processing devices executing stored machine instructions. For example, process 500 may be implemented by a collaboration service, such as collaboration service 202 shown in FIG. 2. In general, process 500 allows for a created collaboration to be associated with the metadata objects underlying a portion of a report. Since the collaboration is associated with the metadata objects themselves and not the report itself, the collaboration may be applied across multiple reports that make use of the same or related metadata objects. For example, a collaboration created for a portion of a regional sales report may be applied to a corresponding portion of a national sales report, regardless of the report services used to create the reports.

Process 500 includes receiving metadata object identifiers for a report (step 502). In some embodiments, each metadata object associated with a report may have a unique identifier. For example, an XML file sent to a client device with an accessed report may include the following lines:

```
<q id="DP0.DO93" name="Sales revenue" type="MEASURE" agg="SUM" />
<q id="DP0.DO1fc" name="Category" type="DIMENSION" />
<q id="DP0.DObc" name="Year" type="DIMENSION" />
``` where q id is a unique identifier for the object used in the report, name is the associated name of the object, type identifies the type of object (e.g., measure, dimension, etc.), and agg is operation performed to determine the values for the measure object (e.g., by summing the sales revenue values across the "Category" and "Year" dimensions).

In various embodiments, the received metadata object identifiers may also include data regarding their associated visual elements in the report. Visual elements may correspond to a cell of a table, a row of a table, a portion of a chart, or any other visual element displayed as part of a report. For example, an XML file associated with a report may include the following:

```
<element bid="211241" type="cell" qid="DP0.DObc" qname="year" qtype="DIMENSION" formula=" = [Year]"/>
``` where bid is an identifier for a visual element, type is the type of visual element, qid is the unique identifier for the metadata object associated with the visual element, qname is the name of metadata object, qtype is the type of the metadata object (e.g., dimension, measure, etc.), and formula is the portion of the SQL statement corresponding to the dimension.

Each unique metadata object may be associated with a visual element down to the row or cell level. For example, a particular cell of a visual element in a report may be represented in an XML file as follows:

```
<row x ="0" y="408" w="1159" h="24">
<cell id="211241" cidx="7" txt="2005" sid="-32" drid="1" drctx="2005" />
    . . .
</row>
``` where cell id is a unique identifier for the visual cell element, cidx is column number in which the cell appears, txt is a text label for the column, etc. An entire row may be represented in a similar manner as the set of cells across the columns of the table (e.g., containing each cell within the row).

In some embodiments, the report metadata object identifiers may be received in response to the creation, modification, or deletion of a collaboration for a selected visual element of a report. For example, a collaboration may be created for a particular row or cell used in a report. In response, the metadata object identifiers associated with the visual element may be sent to a collaboration service for further processing.

Process 500 also includes receiving collaboration data (step 504). In response to a collaboration being created, modified, or deleted, collaboration data identifying the collaboration may be received by a collaboration service. The collaboration data may include, but is not limited to, the collaboration source (e.g., the type of collaboration service used) and a collaboration identifier (e.g., a unique identifier created for the collaboration by the collaboration service). In some implementations, the collaboration identifier may be a unique activity identifier associated with a particular activity that may be performed on one or more visual elements of a report. For example, a collaboration identifier may be a unique identifier that corresponds to modifying a particular table cell via a report service.

Process 500 also includes identifying any related metadata objects (step 506). According to some embodiments, the received metadata object identifiers may be used to determine any metadata objects belonging to the same hierarchy in the metadata model. For example, a collaboration involving sales revenue data for a sales office located in Los Angeles may have an associated "city" metadata object. Such an object may belong to a hierarchy of locations, such as Country>Region>State>City. Identification of any higher or lower metadata objects in a hierarchy allows for the collaboration to be reflected in any related reports. For example, a sales report for the state of California may use some of the same data as a sales report for the city of Los Angeles, since Los Angeles is located in California.

Process 500 includes associating the collaboration data and the metadata objects (step 508). In various embodiments, the collaboration data, the metadata objects from the report, and any metadata objects associated with the report metadata objects may be associated with one another. For example, assume that a collaboration is created with an identifier "collaboration X2" for a visual element associated with the "city," "year," and "sales revenue" metadata objects of a report. Additional metadata objects "region" and "country" may be identified based on the "city" metadata object from the report. The collaboration identifier may then be associated with the report metadata objects and the additionally identified metadata objects. In one embodiment, a directed graph (e.g., a digraph) may be constructed by a collaboration service using the collaboration data and metadata objects as nodes. Paths along the digraph may represent various sets of metadata objects and collaborations. For example, a first path may include the nodes {"collaboration X2," "city," year," "sales revenue"} to represent that a particular collaboration is associated with the group of metadata objects. Such a path may be used, for example, to retrieve collaboration data associated with collaboration X2 when a report includes the associated metadata objects.

Figure 6:
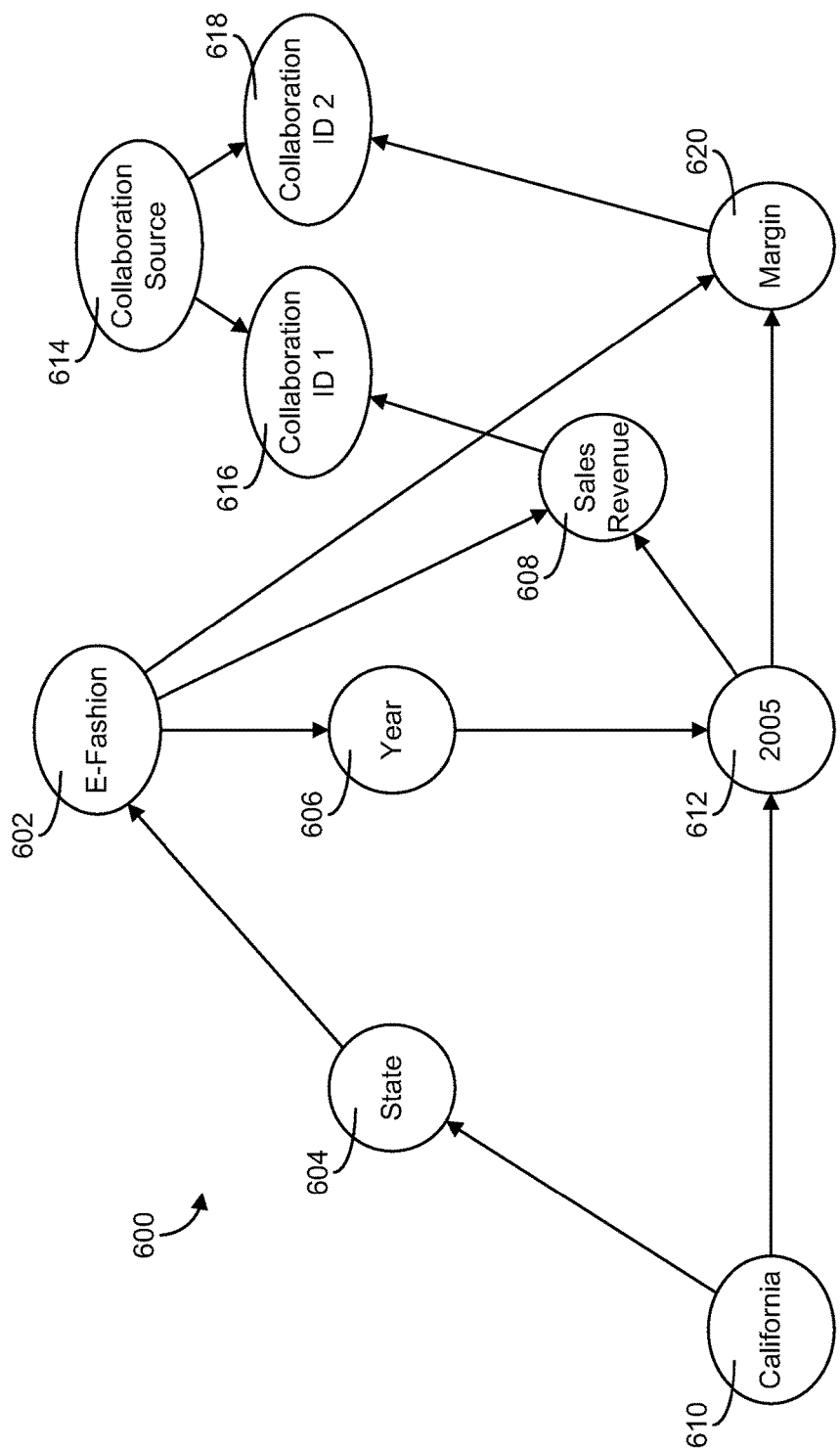
FIG. 6 is a graph linking collaboration data with report data, according to an exemplary embodiment.

Referring now to FIG. 6, a graph 600 linking collaboration data with report data is shown, according to an exemplary embodiment. As shown, graph 600 may be a digraph linking nodes that represent metadata objects and collaboration data. Each edge of graph 600 represents a relationship between the metadata objects and collaboration data. For example, a directed edge may represent a hierarchical relationship between metadata objects or collaboration data. In another example, a directed edge may represent a defined collaboration associated with a set of metadata objects.

Nodes 614, 616, and 618 represent collaboration data that may be used to uniquely identify a collaboration. Each of nodes 616 and 618, for example, may represent unique collaborations created via a collaboration service. Node 614 may be a parent node that identifies the type of collaboration service in which the collaborations of nodes 616, 618 were created. For example, node 614 may identify "Streamwork.com" as the collaboration service in which the collaborations of nodes 616, 618 were created.

Nodes 602-612 and 620 each represent a metadata object that may be used in a report or other document. Similar to nodes 614-618, nodes 602-612 and 620 may include directed edges that represent a hierarchy of metadata objects or a relationship between the objects. For example, node 610 may be linked to node 604 based on California being a type of state. In another example, node 612 may be linked to node 606 since the year 2005 falls within the year category.

A path linking nodes in graph 600 may represent the combination of metadata objects and collaboration data. For example, one path may link nodes 610, 612, 608, 616, and 614. Such a combination may be represented as follows:

```
Combination = {DB:{
                  Year:2005
                  State: California
                  City: SanFrancisco
                  SalesRevenue
                  };
              Collab:{
                  Source:Streamwork.com
                  UniqueID:X2
                  }
              }
```

The combination of metadata objects and collaboration data may then be used to retrieve a collaboration associated with the metadata objects for a report. For example, the X2 collaboration may be retrieved and used whenever a report based on the "year," "state," "city," and "sales revenue" metadata objects is accessed.

In some embodiments, the relationships between the nodes of graph 600 may be queried to identify a collaboration that affects at least a portion of another report. For example, assume that a second report is created that reports on the 2005 profit margin for California and that certain users are able to collaborate on the profit margin figures (e.g., a second collaboration instance has been created, as indicated by node 618). In one embodiment, the collaboration identifier of node 618 may be received in response to the profit margin report being accessed and graph 600 may be analyzed to determine whether node 616 is related. For example, graph 600 may be traversed from node 618 to the metadata objects underlying the profit margin report to identify any other related collaborations (e.g., node 618 is also linked to nodes 610, 612, which underlie the profit margin report). In a further embodiment, only the metadata objects underlying a report may be used to identify a related collaboration (e.g., the report itself may not have a collaboration, but may be based on collaborative data). For example, a national sales report for 2005 may use metadata objects corresponding to nodes 604, 606. A search of graph 600 starting at nodes 604, 606 for any nodes corresponding to a collaboration (e.g., nodes 616, 618). A notification may then be provided in the national sales report regarding the collaborations on the underlying data for the California office.

Figure 7:
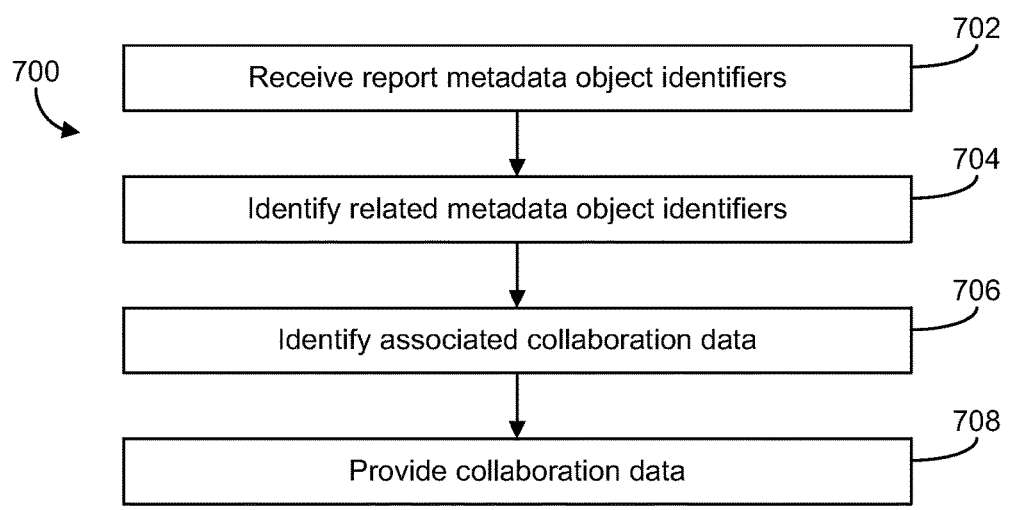
FIG. 7 is a flow diagram of a process for providing collaboration data, according to an exemplary embodiment.

Referring now to FIG. 7, a flow diagram of a process 700 for providing collaboration data is shown, according to an exemplary embodiment. Process 700 may be implemented by one or more processing circuits executing stored machine instructions. For example, process 700 may implemented by collaboration service 202 shown in FIG. 2. Process 700 generally allows for collaboration data to be retrieved and provided to a client device, in response to the client device accessing a particular report or document. The collaboration data may be retrieved based on the metadata objects of the accessed report. In some embodiments, process 700 may be implemented in conjunction with process 500 (e.g., process 500 may be used to link metadata objects to a collaboration and process 700 may be used to retrieve a linked collaboration based on a report's metadata objects).

Process 700 includes receiving report metadata object identifiers (step 702). In one embodiment, identifiers for metadata objects used in a report may be provided to a client device accessing the report. For example, a report service may send an XML file that includes the metadata object identifiers to the client device with the report. In response to accessing the report, the client device may communicate the metadata object identifiers to a collaboration service or another processing device for further evaluation. In one embodiment, the client device may utilize an API of the collaboration service to send the metadata object identifiers as part of a request for any related collaborations. In another embodiment, the report service may provide the metadata object identifiers of the accessed report directly to the collaboration service (e.g., without the client device sending the metadata object identifiers to the collaboration service).

Process 700 includes identifying any related metadata object identifiers (step 704). In various embodiments, the related metadata objects may be metadata objects that belong to the same class hierarchy as the received metadata object identifiers. For example, a "region" metadata object may be related to a "state" metadata object. Step 704 may be conducted in a similar manner to that of step 506 and may or may not use the same machine instructions. In one embodiment, the collaboration service may use the received metadata object identifiers to traverse a digraph that relates metadata objects and collaboration data.

Process 700 includes identifying collaboration data associated with the metadata objects (step 706). Based on the received metadata object identifiers from the accessed report and any related metadata objects, collaboration data associated with the metadata objects may also be identified. For example, a particular collaboration on the 2005 sales revenues for Los Angeles may be identified based on the metadata object identifiers for a 2005 sales report for the State of California. In one embodiment, the collaboration data may be identified by traversing a constructed digraph that uses collaboration data and metadata objects as nodes.

Process 700 also includes providing the collaboration data (step 708). After identifying the collaboration data, the identified collaboration data may be provided back to the client device by the collaboration service. In one embodiment, the identified collaboration data may be provided as part of a collaboration. For example, the client device may display the report and any collaborations that may affect it, thereby allowing a user to review and update the collaborations. In another embodiment, the identified collaboration data may be provided as part of an audit report or a warning to the client device. For example, a collaboration regarding the 2005 sales revenue figures in the San Francisco office may appear as a warning when a 2005 national sales revenue report is accessed.

Figure 8:
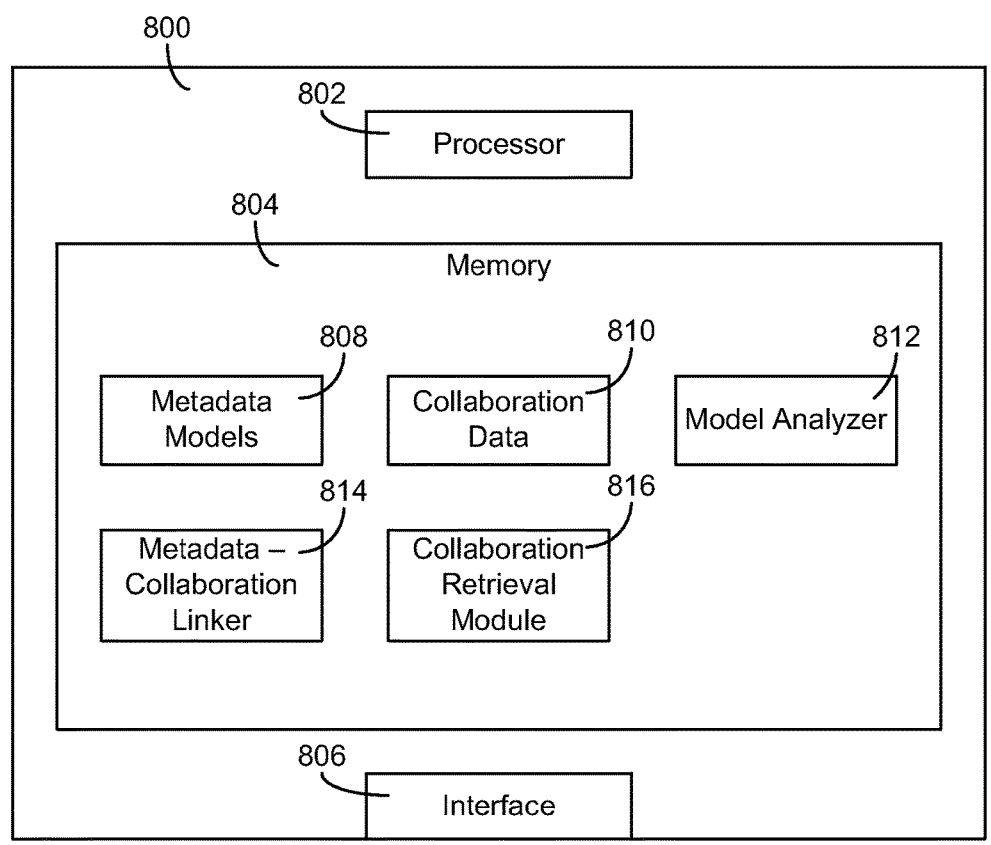
FIG. 8 is a block diagram of a processing circuit configured to enable cross-report collaboration, according to an exemplary embodiment.

Referring now to FIG. 8, a block diagram of a processing circuit 800 configured to enable cross-report collaboration is shown, according to an exemplary embodiment. Processing circuit 800 may be a component of a collaboration service or another device that facilitates collaboration across reports. Processing circuit 800 includes a memory 804 and processor 802. Processor 802 may be, or may include, one or more microprocessors, application specific integrated circuits (ASICs), circuits containing one or more processing components, a group of distributed processing components, circuitry for supporting a microprocessor, or other hardware configured for processing. According to an exemplary embodiment, processor 802 is configured to execute computer code stored in memory 804 to complete and facilitate the activities described herein. Memory 804 can be any volatile or non-volatile computer-readable storage medium capable of storing data or computer code relating to the activities described herein. For example, memory 804 is shown to include modules 812-816 which are computer code modules (e.g., executable code, object code, source code, script code, machine code, etc.) configured for execution by processor 802. According to some embodiments, processing circuit 800 may represent a collection of processing devices (e.g., servers, data centers, etc.). In such cases, processor 802 represents the collective processors of the devices and memory 804 represents the collective storage devices of the devices. When executed by processor 802, processing circuit 800 is configured to complete the activities described herein.

Processing circuit 800 includes hardware circuitry for supporting the execution of the computer code of modules 812-816. For example, processing circuit 800 is shown to include one or more hardware interfaces 806. Hardware interface 806 may include hardware to receive data from a network or serial BUS and to communicate data to another processing circuit via a network or serial BUS. Hardware interface 806 may be configured to receive or transmit data wirelessly (e.g., via radio signals, via infrared signals, etc.) or over a hardwired connection (e.g., a CAT5 cable, a fiber optic cable, etc.). For example, hardware interface 806 may receive data regarding one or more metadata models 808 from a metadata model service, such as metadata model service 116 shown in FIGS. 1-2. Hardware interface 806 may also communicate data to other devices, such as identified collaboration data that may be provided to a client device.

Processing circuit 800 includes data regarding one or more metadata models 808. Metadata models 808 may include identifiers for metadata objects used in a metadata model. In general, metadata models 808 provide a layer of abstraction between the underlying database structures or OLAP cubes of a data source and an application accessing the data of the source (e.g., a report application that uses the stored data as part of a report). The metadata objects may, in some embodiments, be associated with the SQL or other commands used to retrieve, modify, or otherwise access the data stored by a data source. In other words, the metadata objects may correspond to different classes of stored data. Thus, an application may interact with the metadata objects in metadata models 808 to indirectly interact with its corresponding data in the data source. In some embodiments, some of the metadata objects in metadata models 808 may conform to a hierarchy. For example, a year-related metadata object may be related via a hierarchy to other metadata objects representative of a financial quarter, month, or week. Metadata models 808 may include the full models used by the metadata model service or may include identifiers for the metadata objects in the models.

Processing circuit 800 includes collaboration data 810. In general, collaboration data 810 refers to any data that may be used by a collaboration service to allow users to collaborate on a document, a report, or a portion thereof. Collaboration data 810 may include, but is not limited to, a unique identifier for a particular collaboration, an indication of the type of collaboration service in which the collaboration was created, and settings associated with the collaboration (e.g., security settings and other settings). For example, a collaboration stored as part of collaboration data 810 may indicate that the collaboration service is "Streamwork.com," with a unique collaboration ID of "X2225." Additional data, such as which user accounts are associated with the collaboration, the permissions of the user accounts for the collaboration, and messages sent between users as part of the collaboration, may also be stored as part of collaboration data 810.

Processing circuit 800 may include a metadata-collaboration linker 814, in some embodiments. In general, metadata-collaboration linker 814 is configured to associate a collaboration in collaboration data 810 with one or more metadata objects in metadata models 808. In one embodiment, metadata-collaboration linker 814 may receive identifiers for the metadata objects and collaborations to be linked. For example, an XML or similar file containing identifiers for the metadata objects used in a report may be downloaded by a client device when the report is accessed (e.g., via a report service). When a collaboration is created or modified regarding the report, the client device may communicate the corresponding metadata object identifiers and collaboration identifiers to processing circuit 800. In response, metadata-collaboration linker 814 may associate the received collaboration identifier with the received metadata object identifiers.

According to various embodiments, metadata-collaboration linker 814 uses a graph data structure to store the related metadata objects and collaborations. In such cases, the nodes of the graph may correspond to the metadata objects and collaboration data. Edges of the graph linking the nodes may correspond to relationships between the metadata objects and collaboration data. For example, the graph may contain edges that link the metadata objects underlying the portion of the report for which a collaboration is created. The graph may also contain edges linking those metadata objects with collaboration data, such as the source of the collaboration or a unique identifier for the collaboration.

Processing circuit 800 may include a model analyzer 812 configured to determine relationships between metadata objects in metadata models 808. Model analyzer 812 may utilize any manually or automatically defined relationships in metadata models 808 to identify related metadata objects. In one embodiment, model analyzer 812 may receive an identifier for a metadata object in metadata models 808 and identify any other metadata objects in the same hierarchy as it. For example, model analyzer 812 may receive an identifier for a "city" dimension object in metadata models 808. The "city" metadata object may belong to a hierarchy of objects in metadata models 808, such as Country>State>City. In such a case, model analyzer 812 may identify the state and country-related metadata objects in metadata models 808 as being related to the "city" metadata object.

In some embodiments, metadata-collaboration linker 814 utilizes model analyzer 812 to identify any metadata objects in metadata models 808 that are related to the metadata objects underlying at least a portion of a report. For example, a "month" metadata object may underlie a sales report for the month of August. If a collaboration is created for the August sales data, model analyzer 812 may identify that the "month" metadata object belongs to the hierarchy Year>Month. In such a case, model analyzer 812 may identify the "year" metadata object in metadata models 808 as being related to the "month" metadata object used for the sales report. In one embodiment, metadata-collaboration linker 814 may include any related metadata objects identified by model analyzer 812 in the set of associated metadata objects and collaborations. For example, metadata-collaboration linker 814 may determine that the "year" metadata object is related to a particular collaboration that uses the "month" metadata object, since collaborations on a report at the month level affect reports at the year level. Metadata-collaboration linker 814 may, in one embodiment, include any additional metadata objects identified by model analyzer 812 in a graph or other data structure that relates metadata objects and collaborations. In such a case, edges of the graph may also be constructed to represent the corresponding metadata object hierarchy or other relationship identified by model analyzer 812.

Processing circuit 800 includes a collaboration retrieval module 816, in some embodiments. In general, collaboration retrieval module 816 is configured to use received metadata object identifiers to determine any collaborations related to the objects. In one embodiment, a client device may receive identifiers for metadata objects underlying an accessed document or report (e.g., via an XML file or file in another format). The client device may then send the metadata object identifiers to collaboration retrieval module 816 to determine whether any collaborations are related to the metadata objects for the report or document. In one embodiment, collaboration retrieval module 816 may receive the metadata object identifiers via an API or similar interface mechanism. In another embodiment, the set of metadata object identifiers may instead be received by collaboration retrieval module 816 via a backend device instead of from the client device. For example, collaboration retrieval module 816 may receive the metadata object identifiers from a report service.

To determine whether a collaboration is related to the metadata objects for a report, collaboration retrieval module 816 may analyze the relationships between the metadata objects and collaboration data generated by metadata-collaboration linker 814. In one embodiment, collaboration retrieval module 816 may traverse a graph or other data structure generated by metadata-collaboration linker 814 to determine whether any collaborations are related to the metadata objects for the report. In embodiments in which metadata-collaboration linker 814 also associated a collaboration with metadata objects belonging to a hierarchy or other defined relationship, collaboration retrieval module 816 may also analyze these metadata objects to determine whether a related collaboration exists.

Collaboration retrieval module 816 may provide any of collaboration data 810 for a collaboration related to the metadata objects underlying a report or document to another device. In one embodiment, collaboration retrieval module 816 may provide collaboration data 810 directly to a client device. For example, collaboration retrieval module 816 may cause the client device to display a report, alert, or other notification to convey to a user that at least a portion of the data underlying a report is associated with a collaboration. In another embodiment, collaboration retrieval module 816 may provide collaboration data 810 to a collaboration service configured that enables collaborations on the client device. For example, a collaboration identified by collaboration retrieval module 816 may be made available for review or editing at the client device by the corresponding collaboration service.

In one example, assume that a collaboration was created for a sales report for the state of Connecticut for the year 2015. For the collaboration, users located in the Hartford sales office are able to add or modify the Hartford-related portions of the sales figures used in the Connecticut report. In such a case, metadata-collaboration linker 814 may identify the "sales revenues," "city," and "year" metadata objects as being related to the collaboration. Now, assume that the "city" metadata object is part of a hierarchy in metadata models 808 of the form Country>State>City. In such a case, the "country" and "state" metadata objects may also be associated with the collaboration by metadata-collaboration linker 814. If a user later attempts to access a 2015 national sales report using the same report service or a different report service, collaboration retrieval module 816 may identify the collaboration on the 2015 Hartford-related sales data as being related to the metadata objects for the 2015 national sales report. In response, the user may be notified of the collaboration.

Figure 9:
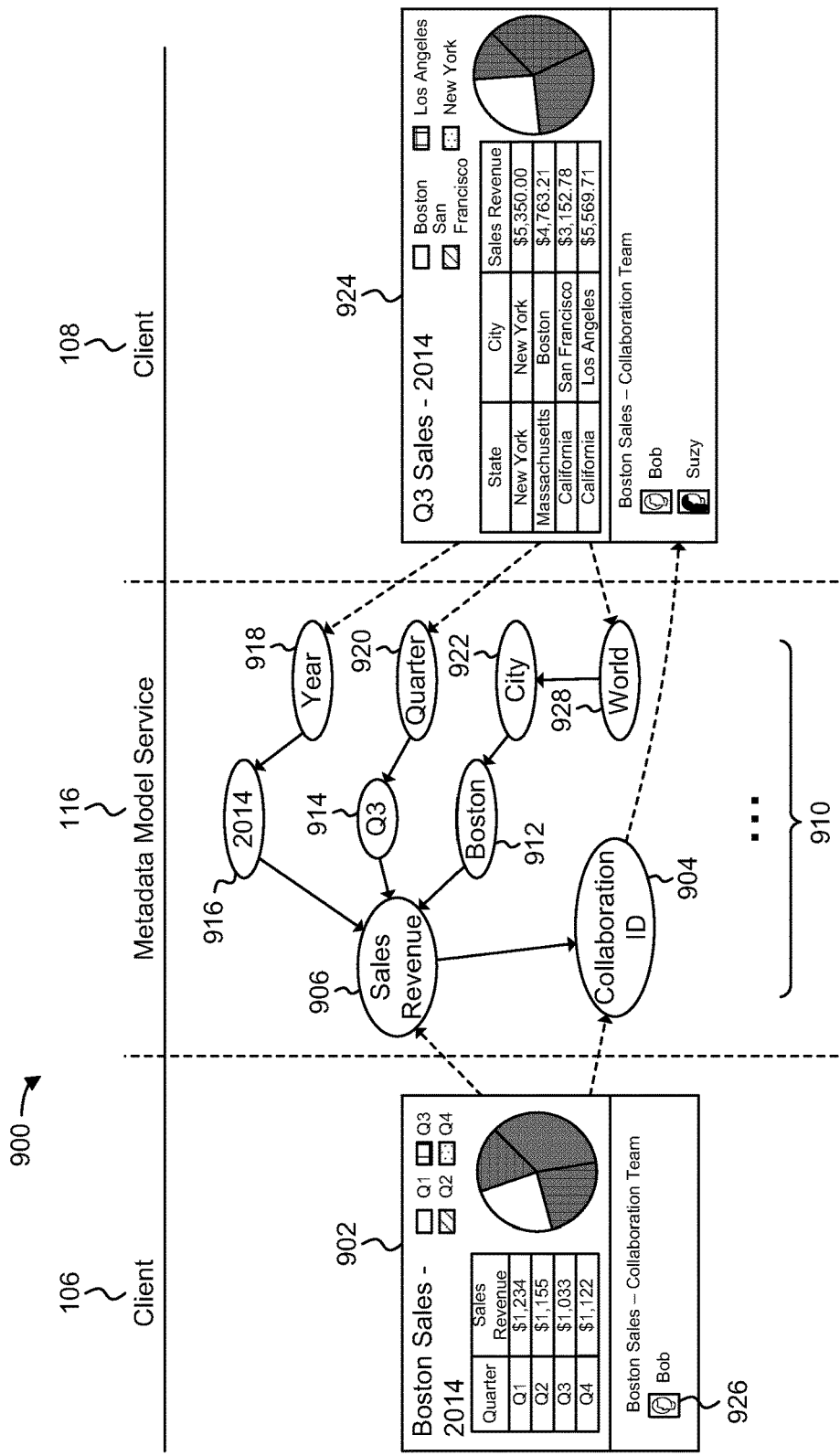
FIG. 9 is an illustration of collaboration information being shared between reports, according to an exemplary embodiment.

Referring now to FIG. 9, an illustration 900 is shown of collaboration information being shared between reports, according to an exemplary embodiment. In the example shown, assume that the client devices 106, 108 shown in FIG. 2 are used to access different reports 902, 924, respectively. Underlying each of reports 902, 924 is data accessible via metadata model service 116 (e.g., metadata model service 116 provides a layer of abstraction between the reports and the data sources in which the report data are stored). In one embodiment, client devices 106, 108 access reports 902, 924, respectively, using the same report service. For example, reports 902, 924 may be created and accessed via report service 206 shown in FIG. 2. In another embodiment, client devices 106, 108 may access reports 902, 924 using different report services (e.g., report services 204, 206 shown in FIG. 2).

Metadata model service 116 may store a set of hierarchies or other relationships between the metadata objects underlying reports 902, 924. For example, assume that report 902 is a yearly sales report for the Boston office for the year 2014. In such a case, the metadata objects stored by metadata model service 116 may include metadata object 906 corresponding to sales revenues, metadata object 912 corresponding to the Boston office, and metadata object 916 corresponding to the year 2014. Metadata objects 906, 912, 916 may be related in metadata model service 116 such that the metadata objects and their relationships correspond to the portion of data used in report 902. In other words, report 902 includes "Sales Data" for the "Boston" office from the year "2014." Underlying these relationships in metadata model service 116 may be a SQL statement that merges data from different database tables using conditions corresponding to metadata objects 906, 912, 916, to retrieve the data in report 902.

Metadata objects 906, 912, 916 underlying report 902 may also be related to other metadata objects stored in metadata model service 116. In one embodiment, the relationship may be a hierarchy of metadata objects. For example, metadata object 916 (e.g., "2014") may belong to the same hierarchy as metadata object 918 (e.g., "Year"). Underneath metadata object 918 may also be other hierarchy branches, such as metadata object 920 (e.g., "Quarter") and metadata object 914 (e.g., "Q3"). Similarly, metadata object 912 (e.g., "Boston") may belong to the same hierarchy as metadata object 922 (e.g., "City"), which is in the same hierarchy as metadata object 928 (e.g., "World"). Further metadata objects may also be associated with those underlying report 902 but are not shown in FIG. 9 for purposes of brevity.

In one embodiment, client devices 106, 108 may also utilize a collaboration service, such as collaboration service 202 shown in FIG. 2, to collaborate on reports. For example, user 926 may be assigned responsibility for the 2014 sales revenue figures for the Boston office via the collaboration service. In such a case, the collaboration service may assign a unique collaboration identifier 904 to the created collaboration. In various embodiments, the collaboration service may also relate collaboration identifier 904 to the metadata objects underlying report 902 that are tied to the collaboration (e.g., metadata objects 906, 912, 914, 916, and any other metadata objects). For example, client 106 may send identifiers for metadata objects 906, 912, 914, 916 to the collaboration service when a new collaboration is created for report 902. In response, the collaboration service may generate a graph 910 that relates collaboration identifier 904 to the metadata objects underlying report 902 that are tied to the collaboration (e.g., metadata objects 906, 912, 914, 916), as well as any other metadata objects hierarchically-related to metadata objects 906, 912, 914, 916 in the metadata model service 116 (e.g., metadata objects 914, 918, 920, 922).

Similar to report 902, report 924 being accessed by client 108 may have underlying metadata objects stored in metadata model service 116 which act as a layer of abstraction between report 924 and the databases storing its report data. For example, report 902 may be a world-wide sales report for the third quarter of 2014. Such a report may, for example, combine all of the sales information in this time period across all of the company's world-wide sales offices, including the Boston sales office. In other words, reports 902, 924 may have overlapping data sets, since both reports include data regarding the Boston office's sales figures from Q3 2014.

When client 108 accesses report 924, it may send identifiers for its underlying metadata objects to the collaboration service, to determine whether any collaborations exist that may affect report 924. In one embodiment, a set of metadata object identifiers for the metadata objects underlying report 924 may be sent to client 108, when report 924 is accessed. Client 108 may then send the set of metadata object identifiers to the collaboration service, to determine whether a related collaboration exists (e.g., via an API of the collaboration service or another mechanism). In response, the collaboration service may analyze the received metadata object identifiers and graph 910, to determine whether a related collaboration exists. For example, some of the metadata objects underlying report 924 may belong to the same hierarchies as the metadata objects underlying report 902 (e.g., the "World" metadata object 928 and "Boston" metadata object 912 may belong to the same hierarchy). In such a case, the collaboration service may determine that collaboration identifier 904 is related to data used in report 924. The collaboration service may then provide information regarding the collaboration to client 108. For example, the user of client 108 may be alerted to the fact that "Bob" (e.g., user 926) is responsible for the 2014 sales figures for the Boston office. Such an alert may be provided despite report 924 not being explicitly associated with collaboration identifier 904 by a user. The alert may also be provided across different reporting services, if report 902 is accessed via a different report service than report 924.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product embodied on a tangible medium or packaged into multiple such software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A computerized method for managing collaborations spanning multiple reports and reporting platforms, comprising:
   receiving a selection associated with a data object used by a first report of a first reporting platform, the data object being underlying data for the first report;
   generating a data structure for the data object responsive to an indication creating a defined collaboration instance, the defined collaboration instance being associated with the data object and facilitating that at least two users can create, access and modify the data object as the underlying data of the first report, the data structure comprising a collaboration identifier, an identifier associated with the data object, and collaboration metadata;
   receiving the identifier associated with the data object responsive to the data object being used by a second report of a second reporting platform;
   identifying the generated data structure for the defined collaboration instance based on the received identifier of the data object; and
   providing the collaboration metadata to the second reporting platform, responsive to the data object being used by the second report of the second reporting platform, such that the defined collaboration instance is carried over from the first report to the second report.

2. The method of claim 1, wherein the data object functions as a layer of abstraction between a report service through which the first report may be accessed and one or more databases storing data used in the first report.

3. The method of claim 2, wherein the data object corresponds to a condition statement for a database search query.

4. The method of claim 1, further comprising:
   identifying a second data object as being hierarchically related to the data object, wherein the data structure further comprises a second identifier associated with the second data object.

5. The method of claim 1, wherein the identifier associated with the data object is received via an application programming interface.

6. The method of claim 1, wherein the collaboration metadata is provided via a collaboration service to a device accessing the second report.

7. A system for managing collaborations spanning multiple reports and reporting platforms comprising:
   a processing circuit configured to:
      receive a selection associated with a first data object used by a first report of a first reporting platform, the first data object being underlying data for the first report,
      generate a data structure for the first data object responsive to an indication creating a defined collaboration instance, the defined collaboration instance being associated with the first data object and facilitating that at least two users can create, access and modify the first data object as the underlying data of the first report, the data structure comprising a collaboration identifier, a first identifier associated with the first data object, a second identifier associated with a second data object, and collaboration metadata,
      receive the second identifier associated with the second data object responsive to the second data object being used by a second report of a second reporting platform,
      identify the generated data structure for the defined collaboration instance based on the received second identifier of the second data object, and
      provide the collaboration metadata to the second reporting platform responsive to the second data object being used by the second report of the second reporting platform, such that the defined collaboration instance is carried over from the first report to the second report.

8. The system of claim 7, wherein the first data object functions as a layer of abstraction between a report service through which the first report may be accessed and one or more databases storing data used in the first report.

9. The system of claim 8, wherein the first data object corresponds to a condition statement for a database search query.

10. The system of claim 7, wherein the processing circuit is configured to identify the second data object as being hierarchically related to the first data object.

11. The system of claim 7, wherein the second identifier associated with the second data object is received via an application programming interface.

12. The system of claim 7, wherein the collaboration metadata is provided via collaboration service to a device accessing the second report.

13. A computerized method comprising:
   receiving, at a processing circuit, a selection associated with a first data object used by a first report of a first reporting platform, the first data object being underlying data for the first report;
   generating, via a collaboration service, a data structure for the first data object responsive to an indication creating a defined collaboration, the defined collaboration being associated with the first data object and facilitating that at least two users can create, access and modify the first data object as the underlying data of the first report, the data structure comprising a collaboration identifier, a first identifier associated with the first data object, a second identifier associated with a second data object, and collaboration metadata;
   receiving, at the processing circuit, an identifier for a class of data underlying a second report and responsive to access to the second report, the class of data comprising the first data object or the second data object;
   identifying, by the processing circuit, the data structure of the defined collaboration based on the class of data; and
   providing, by the processing circuit, the collaboration metadata of the defined collaboration in conjunction with the second report to signify that at least a portion of the data underlying the second report is subject to the defined collaboration, such that the defined collaboration is carried over from the first report to the second report.

14. The method of claim 13, wherein the class of data comprises a metadata object that functions as a layer of abstraction between a report service through which the second report may be accessed and one or more databases storing data used in the second report.

15. The method of claim 14, wherein the class of data corresponds to a condition statement for a database search query.

16. The method of claim 13, further comprising:
   identifying, by the processing circuit, a second class of data hierarchically related to the class of data underlying the second report; and
   using the second class of data to identify the data structure of the defined collaboration used by the first report.

17. The method of claim 13, further comprising:
   searching a graph relating classes of data and defined collaborations to identify the data structure.

18. The method of claim 13, wherein the identifier for the class of data is received via an application programming interface.

19. The method of claim 13, wherein the collaboration metadata of the defined collaboration is provided via the collaboration service to a device accessing the second report.

20. The method of claim 14, wherein the first report is accessed via a different report service than the report service used to access the second report.

* * * * *